US009889771B2

(12) United States Patent
Ohno et al.

(10) Patent No.: US 9,889,771 B2
(45) Date of Patent: Feb. 13, 2018

(54) OCCUPANT PROTECTION DEVICE INCLUDING LUMBAR SUPPORT

(71) Applicant: TOYOTA JIDOSHA KABUSHIKI KAISHA, Toyota-shi (JP)

(72) Inventors: Mitsuyoshi Ohno, Miyoshi (JP); Katsuya Shimazu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/140,970

(22) Filed: Apr. 28, 2016

(65) Prior Publication Data

US 2016/0325641 A1 Nov. 10, 2016

(30) Foreign Application Priority Data

May 7, 2015 (JP) .................................. 2015-095119
Feb. 1, 2016 (JP) .................................. 2016-017155

(51) Int. Cl.

| B60R 21/207 | (2006.01) |
| B60R 22/46 | (2006.01) |
| B60N 2/42 | (2006.01) |
| B60N 2/427 | (2006.01) |
| B60N 2/66 | (2006.01) |
| B60N 2/02 | (2006.01) |
| B60R 21/231 | (2011.01) |
| B60R 21/02 | (2006.01) |
| B60R 21/00 | (2006.01) |

(52) U.S. Cl.
CPC ......... *B60N 2/0276* (2013.01); *B60N 2/4228* (2013.01); *B60N 2/4279* (2013.01);
(Continued)

(58) Field of Classification Search
CPC .......... B60R 21/207; B60R 2021/0011; B60R 2021/01272; B60R 2021/0273;
(Continued)

(56) References Cited

U.S. PATENT DOCUMENTS 5,186,494 A * 2/1993 Shimose .............. B60N 2/4221
100/268
5,533,787 A * 7/1996 Xiang .................. B60N 2/4879
297/228.1
(Continued)

FOREIGN PATENT DOCUMENTS

DE 102007002185 A1 * 7/2008 ......... B60N 2/42745
JP 2000-236984 9/2000
(Continued)

*Primary Examiner* — Laura Freedman
(74) *Attorney, Agent, or Firm* — Oblon, McClelland, Maier & Neustadt, L.L.P.

(57) ABSTRACT

An occupant protection device includes: a lumbar support section that is displaceable between an upper limit position and a lower limit position, and is displaceable between an advanced position pressing against the lumbar region and a retreated position further to a seatback rear side than the advanced position; a displacement mechanism that displaces a frontmost location of the lumbar support section; a rear collision prediction section that predicts a rear-end collision to a vehicle; and an actuation controller that, in cases in which a vehicle rear-end collision has been predicted by the rear collision prediction section in a state in which the frontmost location of the lumbar support section is not at the lower limit position, controls the displacement mechanism, and sets the frontmost location at the lower limit position and at the advanced position.

7 Claims, 11 Drawing Sheets

(52) U.S. Cl.
CPC ............ *B60N 2/665* (2015.04); *B60N 2/666* (2015.04); *B60N 2/6671* (2015.04); *B60N 2/6673* (2015.04); *B60R 21/207* (2013.01); *B60R 22/46* (2013.01); *B60R 2021/0011* (2013.01); *B60R 2021/0273* (2013.01); *B60R 2021/23107* (2013.01)

(58) Field of Classification Search
CPC .......... B60R 2021/23107; B60R 22/46; B60N 2/0276; B60N 2/4279; B60N 2/4228; B60N 2/66; B60N 2/665; B60N 2/666; B60N 2/6671; B60N 2/6673
See application file for complete search history.

(56) References Cited

U.S. PATENT DOCUMENTS

| | | | | |
|---|---|---|---|---|
| 5,868,466 A * | 2/1999 | Massara | ................ | A47C 7/467 297/284.6 |
| 6,203,105 B1 * | 3/2001 | Rhodes, Jr. | .............. | A47C 4/54 297/284.1 |
| 6,213,512 B1 * | 4/2001 | Swann | ................... | B60R 22/46 180/271 |
| 6,273,810 B1 * | 8/2001 | Rhodes, Jr. | .............. | A47C 4/54 297/180.13 |
| 6,666,292 B2 * | 12/2003 | Takagi | ............. | B60R 21/01516 180/268 |
| 7,967,379 B2 * | 6/2011 | Walters | ................... | A47C 1/023 297/284.3 |
| 9,327,625 B2 * | 5/2016 | Sakata | ................. | B60N 2/0244 |
| 9,333,889 B1 * | 5/2016 | Cloutier | .............. | B60N 2/5642 |
| 2016/0347222 A1 * | 12/2016 | Uno | ...................... | B60N 2/665 |
| 2017/0008480 A1 * | 1/2017 | Ohno | ................... | B60N 2/4279 |

FOREIGN PATENT DOCUMENTS

| | | | | |
|---|---|---|---|---|
| JP | 2007-106379 | | 4/2007 | |
| JP | 2010-179766 | | 8/2010 | |
| JP | 2012218612 A | * | 11/2012 | |
| JP | 2013154867 A | * | 8/2013 | |
| JP | 2013163468 A | * | 8/2013 | |
| JP | 2014085084 A | * | 5/2014 | ............... B60N 2/24 |

* cited by examiner

OCCUPANT PROTECTION DEVICE INCLUDING LUMBAR SUPPORT

CROSS-REFERENCE TO RELATED APPLICATIONS

This application claims priority under 35 USC 119 from Japanese Patent Application No. 2015-95119 filed on May 7, 2015, and Japanese Patent Application No. 2016-17155 filed on Feb. 1, 2016, the disclosures of which are incorporated by reference herein.

BACKGROUND

Technical Field

An exemplary embodiment of the present invention relates to an occupant protection device.

Description of the Related Art

Japanese Patent Application Laid-Open (JP-A) No. 2007-106379 describes technology relating to an occupant protection device with an object of suppressing occupant whiplash in a vehicle rear-end collision (abbreviated to "rear collision" as appropriate hereafter). Briefly, in this prior art, a lumbar support is moved toward the vehicle front side and restrains the lumbar region of the seated occupant before the rear collision occurs by actuating a lumbar support drive device when a rear collision of the vehicle has been predicted. Note that such lumbar supports are also described in JP-A No. 2000-236984 and JP-A No. 2010-179766.

SUMMARY OF THE INVENTION

Technical Problem

The prior art described in JP-A No. 2007-106379 may be expected to be effective as a measure to suppress whiplash in a seated occupant in a rear collision. However, in everyday use, the position of the lumbar region that is supported by the lumbar support cannot be displaced in a seatback up-down direction. There is accordingly room for improvement from the perspective of the comfort of the seated occupant.

When employing a device capable of adjusting the lumbar region support position of the lumbar support upward and downward, in a rear collision, it is easier for the seated occupant to tilt if the support position is set at a lower limit position, thereby enabling the head of the seated occupant to be supported by a headrest at an early timing. Accordingly, from the perspective of reducing the load applied to the neck of the seated occupant, it is beneficial for the lumbar region support position of the lumbar support to be set at the lower limit position.

However, the lumbar region support position that the seated occupant finds most comfortable during everyday use differs between seated occupants, and sometimes the lumbar region support position of the lumbar support is not set at the lower limit position.

An object of one exemplary embodiment of the present invention is to obtain an occupant protection device capable of reducing the load applied to the neck of the seated occupant by supporting the head of the seated occupant with a headrest at an earlier timing in the event of a rear collision, even in cases in which the lumbar region support position of the lumbar support is not set at a lower limit position.

Solution to Problem

An occupant protection device of a first aspect of the present invention includes: a lumbar support section that is provided at a seatback of a vehicle seat, that supports a lumbar region of an occupant seated on a seat cushion of the vehicle seat, and that has a frontmost location disposed furthest to a seatback front side, the frontmost location is displaceable at least between an upper limit position in a seatback up-down direction and a lower limit position in the seatback up-down direction, the upper limit position being a position supporting an upper portion side of the lumbar region and the lower limit position being a position supporting a lower portion side of the lumbar region, and the frontmost location is also displaceable between an advanced position pressing against the lumbar region and a retreated position further to a seatback rear side than the advanced position; a displacement mechanism that displaces the frontmost location of the lumbar support section; a rear collision prediction section that predicts a rear-end collision to a vehicle; and an actuation controller that, in cases in which a vehicle rear-end collision has been predicted by the rear collision prediction section in a state in which the frontmost location of the lumbar support section is not at the lower limit position, controls the displacement mechanism, and sets the frontmost location at the lower limit position and at the advanced position.

Note that the "frontmost location disposed furthest to the seatback front side" refers to the location of the overall lumbar support section that is disposed furthest to the seatback front side. For example, in cases in which the lumbar support section has a shape that protrudes out toward the seatback front side, an apex portion of the protrusion corresponds to the frontmost location.

According to this configuration, the lumbar support section supports the lumbar region of an occupant seated on the seat cushion of the vehicle seat. The frontmost location disposed furthest to the seatback front side of the lumbar support section is displaceable at least between the upper limit position in a seatback up-down direction and the lower limit position in the seatback up-down direction wherein the upper limit position is a position where the lumbar support section supports the upper portion side of the lumbar region and the lower limit position is a position where the lumbar support section supports the lower portion side of the lumbar region, and is also displaceable between the advanced position pressing against the lumbar region and the retreated position further to the seatback rear side than the advanced position. The frontmost location of the lumbar support section is displaced using the displacement mechanism.

In cases in which a vehicle rear-end collision has been predicted by the rear collision prediction section in a state in which the frontmost location of the lumbar support section is not at the lower limit position, the displacement mechanism is actuated, and the frontmost location is set at the lower limit position and at the advanced position. Accordingly, a site where the lumbar region of the seated occupant was being supported initially attempts to place its weight against the seatback rear side under its own weight, and a site at the lower side of the lumbar region is pressed toward the seatback front side. The upper body of the seated occupant is accordingly encouraged to tilt toward the seatback rear side, such that the head of the seated occupant is supported by a headrest at an earlier timing in the event of a rear collision.

A second aspect is the occupant protection device according to the first aspect, wherein: the lumbar support section is capable of moving in the seatback up-down direction; and in cases in which a vehicle rear-end collision has been predicted by the rear collision prediction section, a movable range of the lumbar support section in the seatback up-down direction is extended further to a seatback lower side than a normal movable range of the lumbar support section in the seatback up-down direction.

According to the above configuration, the lumbar support section can be moved toward the seatback lower side whenever a vehicle rear-end collision has been predicted by the rear collision prediction section, thereby enabling the lumbar region support position of the lumbar support section to be lowered.

A third aspect is the occupant protection device according to either the first aspect or the second aspect, further including: a three-point seatbelt device that restrains an upper body of the occupant seated on the seat cushion with shoulder webbing, and that restrains the lumbar region of the occupant with lap webbing; and a pre-tensioner that actuates, and applies tension to the shoulder webbing in cases in which a vehicle rear-end collision has been predicted by the rear collision prediction section, wherein, in cases in which a vehicle rear-end collision has been predicted by the rear collision prediction section in a state in which the frontmost location of the lumbar support section is not at the lower limit position, the actuation controller actuates the pre-tensioner and then controls the displacement mechanism, and sets the frontmost location at the lower limit position and at the advanced position.

According to the above configuration, the three-point seatbelt device retains the upper body of the occupant seated on the seat cushion with the shoulder webbing, and restrains the lumbar region of the occupant with the lap webbing. When a vehicle rear-end collision has been predicted by the rear collision prediction section, the pre-tensioner is actuated, thereby applying tension to the shoulder webbing. The upper body of the occupant accordingly receives load toward the seatback rear side. Moreover, in cases in which a vehicle rear-end collision has been predicted by the rear collision prediction section in a state in which the frontmost location of the lumbar support section is not at the lower limit position, the displacement mechanism is actuated after actuating the pre-tensioner, and the frontmost location is set at the lower limit position and at the advanced position. The support position of the lumbar support section is accordingly lowered, and a site at the lower side of the lumbar region of the seated occupant is pressed toward the seatback front side, after the upper body of the seated occupant has received the load toward the seatback rear side. This thereby further encourages the upper body of the seated occupant to tilt toward the seatback rear side.

A fourth aspect is the occupant protection device of any one of the first aspect to the third aspect, wherein: the displacement mechanism includes a raising-and-lowering mechanism that moves the lumbar support section in the seatback up-down direction, and an advancing-and-retreating mechanism that moves the frontmost location in a seatback front-rear direction; and in cases in which a vehicle rear-end collision has been predicted by the rear collision prediction section in a state in which the frontmost location of the lumbar support section is not at the lower limit position, when the frontmost location is not disposed at the advanced position, the actuation controller controls the raising-and-lowering mechanism, moves the lumbar support section to a seatback lower side movement limit, then controls the advancing-and-retreating mechanism, and moves the frontmost location to the advanced position on the seatback front side, and when the frontmost location is disposed at the advanced position, the actuation controller controls the raising-and-lowering mechanism, and moves the lumbar support section to the seatback lower side movement limit.

According to the above configuration, in cases in which a vehicle rear-end collision has been predicted by the rear collision prediction section in a state in which the frontmost location of the lumbar support section is not at the lower limit position, when the frontmost location is not disposed at the advanced position, the lumbar support section is moved to the seatback lower side movement limit by the raising-and-lowering mechanism, and then the frontmost location is moved to the advanced position on the seatback front side by the advancing-and-retreating mechanism. Accordingly, after a rear-end collision has been predicted, the supported state by the frontmost location of the site of the lumbar region of the seated occupant that was initially supported by the frontmost location is released at an early timing. The site at the lower side of the lumbar region is then pressed toward the seatback front side. After a rear-end collision has been predicted, the upper body of the seated occupant can accordingly be encouraged to tilt toward the seatback rear side at an early timing.

Moreover, in cases in which a vehicle rear-end collision has been predicted by the rear collision prediction section in a state in which the frontmost location of the lumbar support section is not at the lower limit position, when the frontmost location is disposed at the advanced position, the lumbar support section is moved to the seatback lower side movement limit by the raising-and-lowering mechanism. Accordingly, after a rear-end collision has been predicted, the site at the lower side of the lumbar region is pressed toward the seatback front side while releasing the supported state by the frontmost location of the site of the lumbar region of the seated occupant that was initially supported by the frontmost location at an early timing. Note that at the point in time when the vehicle rear-end collision is predicted, the frontmost location is disposed at the advanced position, thereby enabling the site of the lumbar region where the supported state by the frontmost location is released to obtain a stroke that permits displacement toward the seatback rear side at an early timing. After a rear-end collision has been predicted, the upper body of the seated occupant can accordingly be encouraged to tilt toward the seatback rear side at an even earlier timing.

Advantageous Effects of Invention

As described above, the occupant protection device of the present invention exhibits the excellent advantageous effect of enabling a reduction in the load applied to the neck of the seated occupant by supporting the head of the seated occupant with a headrest at an earlier timing in the event of a rear collision, even in cases in which the lumbar region support position of the lumbar support is not set at the lower limit position.

DETAILED DESCRIPTION OF PREFERRED EMBODIMENTS

First Exemplary Embodiment

Figure 1:
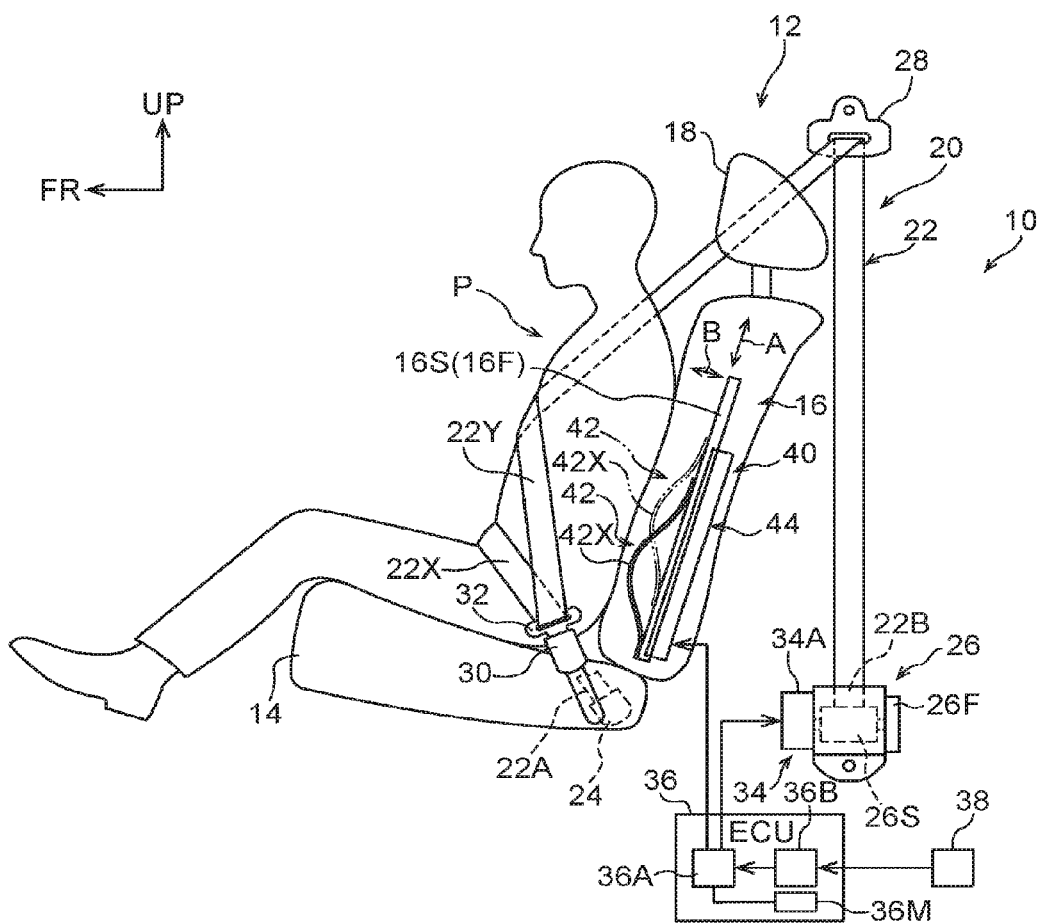
FIG. 1 is a side view schematically illustrating a vehicle seat applied with an occupant protection device according to a first exemplary embodiment.

Explanation follows regarding an occupant protection device according to a first exemplary embodiment of the present invention, with reference to FIG. 1 to FIG. 3. In the drawings, the arrow FR indicates the vehicle front side, and the arrow UP indicates the vehicle upper side, as appropriate.

FIG. 1 is a side view schematically illustrating a vehicle seat 12 applied with an occupant protection device 10 according to the present exemplary embodiment. As an example, the vehicle seat 12 illustrated in FIG. 1 configures a front driving seat. As illustrated in FIG. 1, the vehicle seat 12 includes a seat cushion 14 that supports the buttocks and thighs of a seated occupant P. A seatback 16 that supports the back (and lumbar region) of the seated occupant P is supported at a rear end portion of the seat cushion 14. The seatback 16 can be reclined using a reclining mechanism (not illustrated in the drawings) provided at a coupling portion between the seatback 16 and the seat cushion 14. A headrest 18 that supports the head of the seated occupant P is attached to an upper end portion of the seatback 16. The height of the headrest 18 is adjustable.

A metal seatback frame 16F, serving as a framework member of the seatback 16, is provided at a rear portion inside the seatback 16. The seatback frame 16F includes a pair of left and right side frames 16S extending in a seatback up-down direction at both sides of the seatback 16, and an upper frame (not illustrated in the drawings) that is configured in an inverted U-shape in face-on view of the seatback, and connects together upper end portions of the left and right side frames 16S. The seatback frame 16F further includes a seatback upper reinforcement (not illustrated in the drawings) that connects together upper portions of the left and right side frames 16S along a seatback width direction, and a seatback lower reinforcement (not illustrated in the drawings) that connects together lower portions of the left and right side frames 16S along the seatback width direction.

A three-point seatbelt device 20 is provided corresponding to the vehicle seat 12. The three-point seatbelt device 20 includes occupant restraint webbing 22. One end portion 22A of the webbing 22 is attached to a side portion on the vehicle width direction outside of the seat cushion 14 (a side face portion on the side toward the inside of the page in FIG. 1) through an anchor plate 24, and another end portion 22B of the webbing 22 is anchored to a spool 26S of a webbing take-up device 26. An intermediate portion of the webbing 22 is inserted through folded back around a shoulder anchor 28 provided at an upper side of a vehicle side portion. An upright buckle device 30 is provided at a vehicle width direction inside side portion of the seat cushion 14 (the side face portion illustrated in FIG. 1). A tongue plate 32 supported in a state in which the intermediate portion of the webbing 22 is inserted through it is capable of engaging with the buckle device 30.

In the three-point seatbelt device 20, the tongue plate 32 engages with the buckle device 30 with the occupant in a seated state on the seat cushion 14, such that the webbing 22 is worn across the seated occupant P (an occupant seated on the seat cushion 14). In the engaged state of the tongue plate 32 with the buckle device 30, the webbing 22 configures lap webbing 22X between the tongue plate 32 and the anchor plate 24, and the webbing 22 configures shoulder webbing 22Y between the tongue plate 32 and the shoulder anchor 28. The lap webbing 22X retrains the lumbar region of the seated occupant P, and the shoulder webbing 22Y restrains an upper body of the seated occupant P.

The webbing take-up device 26 is fixed in the vicinity of a lower end portion of a center pillar, not illustrated in the drawings, configuring a vehicle framework member. The spool 26S of the webbing take-up device 26 is disposed with its axial center direction running along the vehicle front-rear direction. A biasing mechanism 26F is disposed on one side (the vehicle rear side) of the spool 26S. The biasing mechanism 26F places the spool 26S under a constant bias toward a take-up rotation direction of the webbing 22.

The webbing take-up device 26 includes a pre-tensioner 34. The pre-tensioner 34 includes a motor 34A disposed on the other side (the vehicle front side) of the spool 26S. The motor 34A rotates to drive the spool 26S in the take-up direction. The motor 34A is electrically connected to an ECU 36 that is installed to the vehicle.

The ECU 36 includes an actuation controller 36A, a rear collision prediction section 36B and a memory section 36M. The rear collision prediction section 36B is electrically connected to a pre-crash safety (PCS) sensor 38 for predicting a rear collision. The PCS sensor 38 is configured including a distance sensor such as a milli-wave radar, and outputs signals to the rear collision prediction section 36B according to the relative distance of a following vehicle (monitoring target object) positioned behind the vehicle itself. The rear collision prediction section 36B predicts a vehicle rear-end collision (a collision between the vehicle itself and the following vehicle) based on the signals output from the PCS sensor 38. The actuation controller 36A actuates the motor 34A of the pre-tensioner 34 when a vehicle rear-end collision has been predicted by the rear collision prediction section 36B, thereby rotating the spool 26S in the take-up direction of the webbing 22 so as to apply tension to the shoulder webbing 22Y.

Prediction of a vehicle rear-end collision by the rear collision prediction section 36B encompasses cases in which a collision is determined to be unavoidable, and also cases in which the likelihood of a collision is determined to be higher than a specific threshold value. Although detailed explanation is omitted here, the pre-tensioner 34 is also controlled by the actuation controller 36A so as to actuate when the vehicle decelerates suddenly. The memory section 36M is, for example, configured by RAM.

A movable lumbar support device 40 is installed to the seatback 16 of the vehicle seat 12. The lumbar support device 40 includes a lumbar support section 42 that supports the lumbar region of the occupant P seated on the seat cushion 14 of the vehicle seat 12, and also includes a displacement mechanism 44 (illustrated in block form in the drawings) for displacing the lumbar support section 42.

Figure 2A:
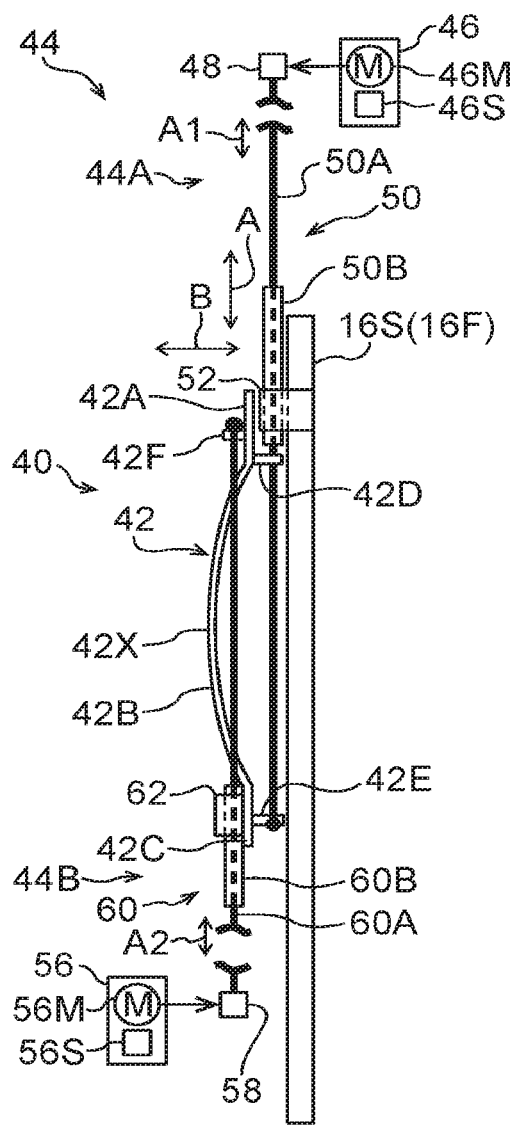
FIG. 2A is a schematic view illustrating a movable structure of a lumbar support section illustrated in FIG. 1 in side view, illustrating a state in which a protrusion apex portion of the lumbar support section is disposed at an upper side and a rear side.

The lumbar support section 42 is inbuilt to the seatback 16 over a range that supports the lumbar region of the seated occupant P (a width direction intermediate portion and a lower portion side of the seatback 16), and is configured by a plate shaped body. FIG. 2A to FIG. 2D are schematic side views illustrating a movable structure of the lumbar support section 42. The respective configuration elements illustrated in FIG. 2A to FIG. 2D are simplified or shown schematically. As illustrated in FIG. 2A, in the lumbar support section 42, an upper end portion 42A and a lower end portion 42C extend in the seatback up-down direction and the seatback width direction, and a lower end of the upper end portion 42A and an upper end of the lower end portion 42C are connected together by a curved portion 42B. The curved portion 42B is curved in a shape protruding toward a seatback front side, and extends along the seatback width direction. Namely, in the present exemplary embodiment, a protrusion apex portion 42X of the curved portion 42B configures the frontmost location of the lumbar support section 42, disposed furthest to the seatback front side.

As illustrated by solid lines and double-dotted intermittent lines in FIG. 1, the protrusion apex portion 42X of the lumbar support section 42 is displaceable in the seatback up-down direction. The protrusion apex portion 42X of the lumbar support section 42 is displaceable between an upper limit position and a lower limit position in the seatback up-down direction. The upper limit position is a position supporting an upper portion side of the lumbar region of the seated occupant P, and is the position of an upper side movement limit of the movable range of the protrusion apex portion 42X in the seatback up-down direction. The upper limit position is set at a lower position in the seatback up-down direction than a position where the shoulder webbing 22Y is disposed at a seat width direction central portion. The lower limit position is a position supporting a lower portion side of the lumbar region of the seated occupant P, and is the position of a lower side movement limit of the movable range of the protrusion apex portion 42X in the seatback up-down direction.

As illustrated in FIG. 2A to FIG. 2D, the protrusion apex portion 42X of the lumbar support section 42 is displaceable in the seatback front-rear direction. More specifically, the protrusion apex portion 42X of the lumbar support section 42 is displaceable between an advanced position pressing the lumbar region of the seated occupant (see FIG. 2B and FIG. 2D), and a retreated position further to a seatback rear side than the advanced position (see FIG. 2A and FIG. 2C). The advanced position (see FIG. 2B and FIG. 2D) is the position of a front side movement limit of the protrusion apex portion 42X in the seatback front-rear direction. The retreated position (see FIG. 2A and FIG. 2C) is the position of a rear side movement limit of the protrusion apex portion 42X in the seatback front-rear direction.

The protrusion apex portion 42X of the lumbar support section 42 is displaced in the seatback up-down direction (the arrow A direction) between the upper limit position and the lower limit position, and is displaced in the seatback front-rear direction (the arrow B direction) between the advanced position and the retreated position, by the displacement mechanism 44. As illustrated in FIG. 2A, the displacement mechanism 44 includes a raising-and-lowering mechanism 44A that moves the lumbar support section 42 in the seatback up-down direction, and an advancing-and-retreating mechanism 44B that moves the protrusion apex portion 42X of the lumbar support section 42 in the front-rear direction of the seatback 16.

The raising-and-lowering mechanism 44A includes a motor 46, as illustrated on the upper side in the drawings. The motor 46 is attached to the seatback frame 16F through brackets or the like, not illustrated in the drawings, and includes a motor body 46M and a sensor section 46S. The motor body 46M is configured so as to be driven based on command signals output from the actuation controller 36A (see FIG. 1). The sensor section 46S includes, for example, a Hall effect IC, and is configured so as to output signals to the memory section 36M (see FIG. 1) according to the rotation (rotation position) of an output shaft of the motor body 46M.

The motor body 46M is connected to a feed screw mechanism 48 that converts rotational movement of the output shaft of the motor body 46M into linear movement. The feed screw mechanism 48 is connected to an inner cable 50A of a push-pull wire 50. The inner cable 50A is disposed further to the seatback rear side than the lumbar support section 42, and passes through a jutting-out portion 42D that juts out toward the seatback rear side from the upper end portion 42A side of the lumbar support section 42 such that the inner cable 50A is capable of moving. A lower end portion of the inner cable 50A is fixed to an attachment portion 42E that juts out toward the seatback rear side from the lower end portion 42C side of the lumbar support section 42.

The inner cable 50A is movably inserted through an outer cable 50B of the push-pull wire 50. The outer cable 50B is fixed to the seatback frame 16F through a coupling portion 52. In these schematic drawings, the outer cable 50B is disposed with its axial center direction running along the seatback up-down direction; however, for example, the outer cable 50B may be disposed in an inverted U-shape with one end portion fixed to the seatback frame 16F, and another end portion disposed in the vicinity of an upper end portion of the lumbar support section 42.

Although omitted from illustration in the drawings, guide mechanisms for guiding the lumbar support section 42 in the seatback up-down direction are provided at both sides of the upper end portion 42A and the lower end portion 42C of the lumbar support section 42. The guide mechanism is configured by a pair of left and right guide wires extending in the seatback up-down direction, and C-shaped wire insertion portions that are respectively formed on both sides of the upper end portion 42A and the lower end portion 42C of the lumbar support section 42, and through which the guide wires are inserted. Note that the guide wires are fixed to the seatback frame 16F through another member.

Due to the above configuration, the inner cable 50A moves corresponding to rotation of the motor body 46M (see the arrow A1 direction), thereby displacing the lumbar support section 42 in the seatback up-down direction. Note that in the present exemplary embodiment, a normal movable range of the lumbar support section 42 in the seatback up-down direction is the same as a movable range of the lumbar support section 42 in the seatback up-down direction when a vehicle rear-end collision has been predicted by the rear collision prediction section 36B (see FIG. 1). Here, "normal" refers to a state in which a vehicle rear-end collision has not been predicted by the rear collision prediction section 36B (see FIG. 1).

The advancing-and-retreating mechanism 44B is attached to the lumbar support section 42 through brackets or the like, not illustrated in the drawings, and the advancing-and-retreating mechanism 44B is displaced in the seatback up-down direction together with the lumbar support section 42. The advancing-and-retreating mechanism 44B includes a motor 56, as illustrated on the lower side in the drawings. The motor 56 includes a motor body 56M and a sensor section 56S. The motor body 56M is configured so as to be driven based on command signals output from the actuation controller 36A (see FIG. 1). The sensor section 56S includes, for example, a Hall effect IC, and is configured so as to output signals to the memory section 36M (see FIG. 1) according to the rotation (rotation position) of an output shaft of the motor body 56M.

The motor body 56M is connected to a feed screw mechanism 58 that converts rotational movement of the output shaft of the motor body 56M into linear movement. The feed screw mechanism 58 is connected to an inner cable 60A of a push-pull wire 60. The inner cable 60A is disposed at the seat width direction outside of the curved portion 42B, and further to the seatback front side than the upper end portion 42A and the lower end portion 42C of the lumbar support section 42. The inner cable 60A is inserted through an outer cable 60B so as to be capable of moving. The outer cable 60B is fixed to the side of a side portion of the lower end portion 42C of the lumbar support section 42 through a coupling portion 62, and is disposed with its axial center direction running along the seatback up-down direction at the fixing location. An upper end portion of the inner cable 60A is fixed to an attachment portion 42F jutting out from the side of the side portion of the upper end portion 42A of the lumbar support section 42 toward the seatback front side.

Due to the above configuration, the inner cable 60A moves corresponding to rotation of the motor body 56M (see the arrow A2 direction), thereby changing the relative position of the upper end portion 42A with respect to the lower end portion 42C of the lumbar support section 42 in the seatback up-down direction, and changing a projection amount of the curved portion 42B. Namely, the protrusion apex portion 42X of the lumbar support section 42 is displaced in the front-rear direction of the seatback 16 by rotation of the motor body 56M.

At a side face of the seat cushion 14 (see FIG. 1), the lumbar support device 40 also includes a manual switch (not illustrated in the drawings) that is employed by the occupant to adjust the position of the lumbar support section 42. The manual switch is configured so as to output signals to the ECU 36 (see FIG. 1) according to the operation of the occupant.

The motors 46, 56 of the displacement mechanism 44 are electrically connected to the ECU 36 (see FIG. 1). When a vehicle rear-end collision has been predicted by the rear collision prediction section 36B in a state in which the protrusion apex portion 42X of the lumbar support section 42 is not at the lower limit position, the actuation controller 36A illustrated in FIG. 1 actuates the pre-tensioner 34, and then controls the displacement mechanism 44 as described below. Specifically, when the protrusion apex portion 42X is not disposed at the advanced position (FIG. 2A), the actuation controller 36A controls the motor body 46M of the raising-and-lowering mechanism 44A such that the lumbar support section 42 moves to the seatback lower side movement limit (FIG. 2C), and then controls the motor body 56M of the advancing-and-retreating mechanism 44B such that the protrusion apex portion 42X moves to the advanced position on the seatback front side (FIG. 2D and FIG. 3B). However, when the protrusion apex portion 42X is disposed at the advanced position (FIG. 2B and FIG. 3A), the actuation controller 36A controls the motor body 46M of the raising-and-lowering mechanism 44A such that the lumbar support section 42 moves to the seatback lower side movement limit (FIG. 2D and FIG. 3B).

In other words, in cases in which a vehicle rear-end collision has been predicted by the rear collision prediction section 36B (see FIG. 1) in a state in which the protrusion apex portion 42X of the lumbar support section 42 is not at the lower limit position, the actuation controller 36A actuates the pre-tensioner 34 (see FIG. 1), and then controls the displacement mechanism 44 such that the protrusion apex portion 42X is set at the lower limit position and at the advanced position, as illustrated in FIG. 2D and FIG. 3B.

Note that the memory section 36M illustrated in FIG. 1 stores the signals output from the sensor sections 46S, 56S (see FIG. 2A) as position information of the protrusion apex portion 42X of the lumbar support section 42. The actuation controller 36A determines whether or not a state is present in which the protrusion apex portion 42X of the lumbar support section 42 is not at the lower limit position based on the protrusion apex portion 42X position information stored in the memory section 36M. Moreover, in the present exemplary embodiment, in cases in which a vehicle rear-end collision has been predicted by the rear collision prediction section 36B in a state in which the protrusion apex portion 42X of the lumbar support section 42 is at the lower limit position but is not at the advanced position (FIG. 2C), the actuation controller 36A actuates the pre-tensioner 34, and then controls the displacement mechanism 44 such that the protrusion apex portion 42X moves to the advanced position on the seatback front side (see FIG. 2D and FIG. 3B).

Operation and Advantageous Effects

Next, explanation follows regarding operation and advantageous effects of the exemplary embodiment described above.

In the present exemplary embodiment, the lumbar support section 42 illustrated in FIG. 1 supports the lumbar region of the occupant P seated on the seat cushion 14 of the vehicle seat 12. The protrusion apex portion 42X of the lumbar support section 42 is displaceable between the upper limit position and the lower limit position and between the advanced position and the retreated position. The protrusion apex portion 42X of the lumbar support section 42 is displaced between the upper limit position and the lower limit position and between the advanced position and the retreated position by the displacement mechanism 44. Accordingly, the seated occupant P can operate the manual switch (not illustrated in the drawings) to set the protrusion apex portion 42X of the lumbar support section 42 to a comfortable position. Note that since the advancing-and-retreating mechanism 44B is attached to the lumbar support section 42, the advancing-and-retreating mechanism 44B is displaced in the seatback up-down direction together with the lumbar support section 42 when the lumbar support section 42 is displaced in the seatback up-down direction by the raising-and-lowering mechanism 44A.

Figure 3A:
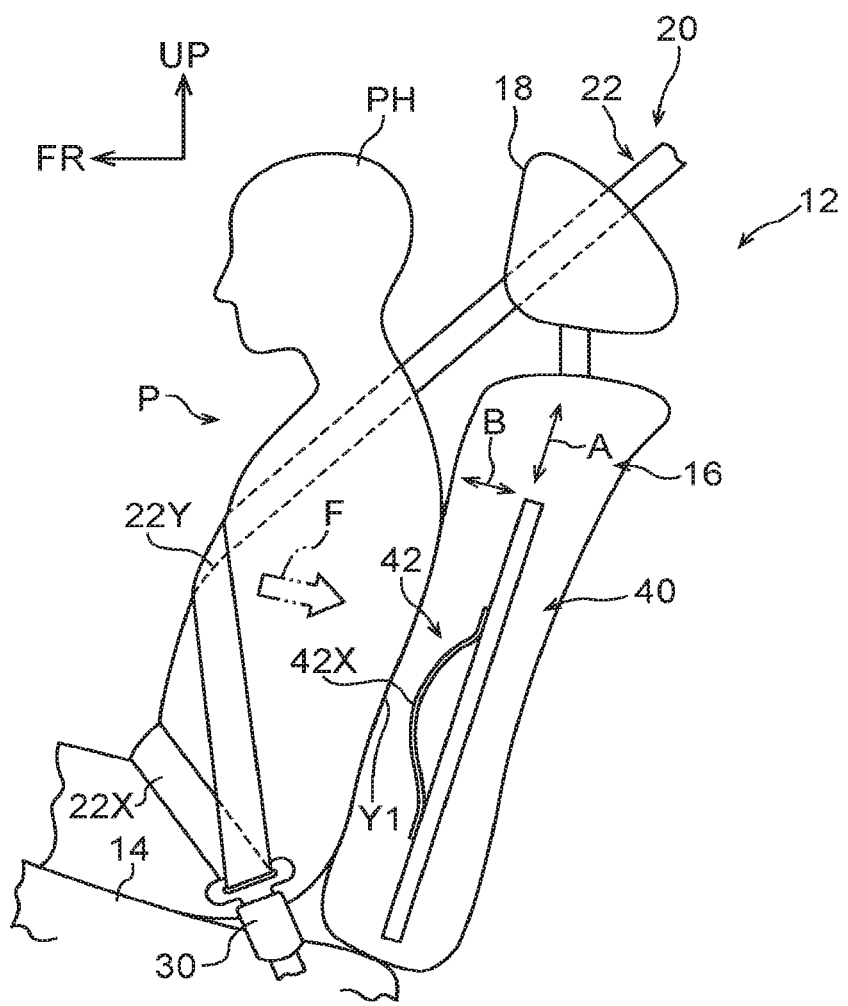
FIG. 3A is a schematic side view to explain operation of the first exemplary embodiment, and illustrates a state immediately prior to actuation of a displacement mechanism on prediction of a vehicle rear-end collision.

In cases in which a vehicle rear-end collision has been predicted by the rear collision prediction section 36B (see FIG. 1) in a state in which the protrusion apex portion 42X of the lumbar support section 42 is not at the lower limit position, for example in the state illustrated in FIG. 3A, the protrusion apex portion 42X is set to the lower limit position and the advanced position by actuating the displacement mechanism 44 (see FIG. 2A), as illustrated in FIG. 3B. Accordingly, a site Y1 where the lumbar region of the seated occupant P was being supported initially attempts to place its weight against the seatback rear side under its own weight (in the arrow B2 direction), and a site Y2 at a lower side of the lumbar region is pressed toward the seatback front side (the arrow B1 direction). The upper body of the seated occupant P is accordingly encouraged to tilt toward the seatback rear side, and the head PH of the seated occupant P is encouraged to move closer to the headrest 18, thereby reducing the amount of relative movement of the head PH of the seated occupant P with respect to the headrest 18 in a rear collision. Namely, the head PH of the seated occupant P is supported by the headrest 18 at an earlier timing in a rear collision.

To explain actuation control of the lumbar support section 42 of the present exemplary embodiment in more detail, in cases in which a vehicle rear-end collision has been predicted by the rear collision prediction section 36B (see FIG. 1) in a state in which the protrusion apex portion 42X of the lumbar support section 42 is not at the lower limit position, and when the protrusion apex portion 42X is not disposed at the advanced position, as illustrated in FIG. 2A, the lumbar support section 42 is moved to the seatback lower side movement limit by the raising-and-lowering mechanism 44A (see FIG. 2C), and then the protrusion apex portion 42X of the lumbar support section 42 is moved to the advanced position on the seatback front side by the advancing-and-retreating mechanism 44B (see FIG. 2D and FIG. 3B). Accordingly, after a rear-end collision has been predicted, the supported state by the protrusion apex portion 42X of the site of the lumbar region of the seated occupant that was initially supported by the protrusion apex portion 42X is released at an early timing. Then, as illustrated in FIG. 3B, the site Y2 at the lower side of the lumbar region is pressed toward the seatback front side. After a rear-end collision has been predicted, the upper body of the seated occupant P can accordingly be encouraged to tilt toward the seatback rear side at an early timing.

Figure 2B:
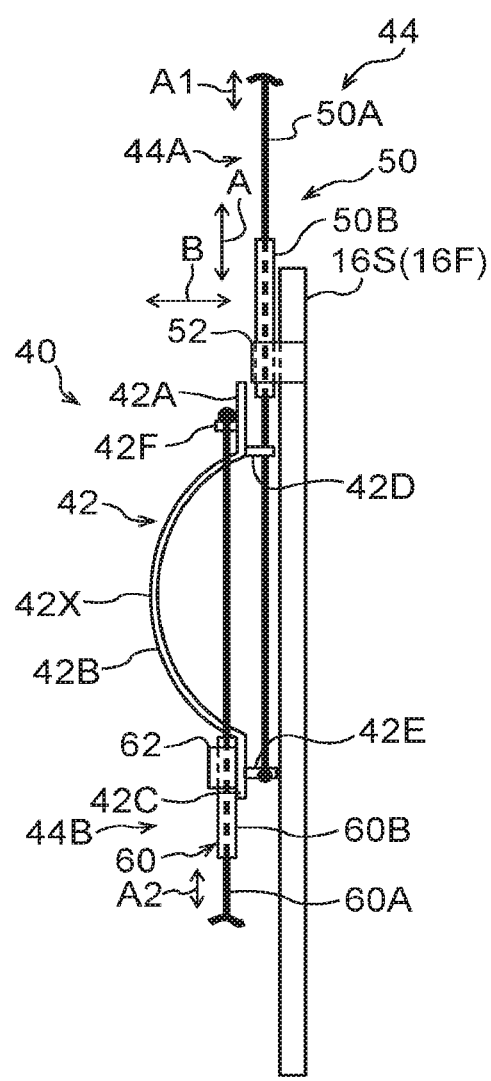
FIG. 2B is a schematic view illustrating a movable structure of a lumbar support section illustrated in FIG. 1 in side view, illustrating a state in which a protrusion apex portion of the lumbar support section is disposed at an upper side and a front side.
Figure 2C:
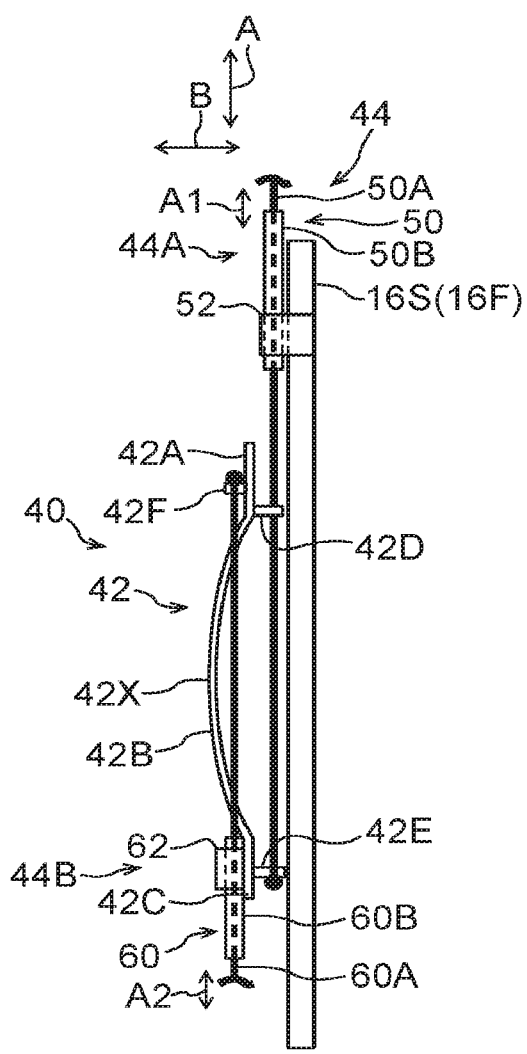
FIG. 2C is a schematic view illustrating a movable structure of a lumbar support section illustrated in FIG. 1 in side view, illustrating a state in which a protrusion apex portion of the lumbar support section is disposed at a lower side and a rear side.
Figure 2D:
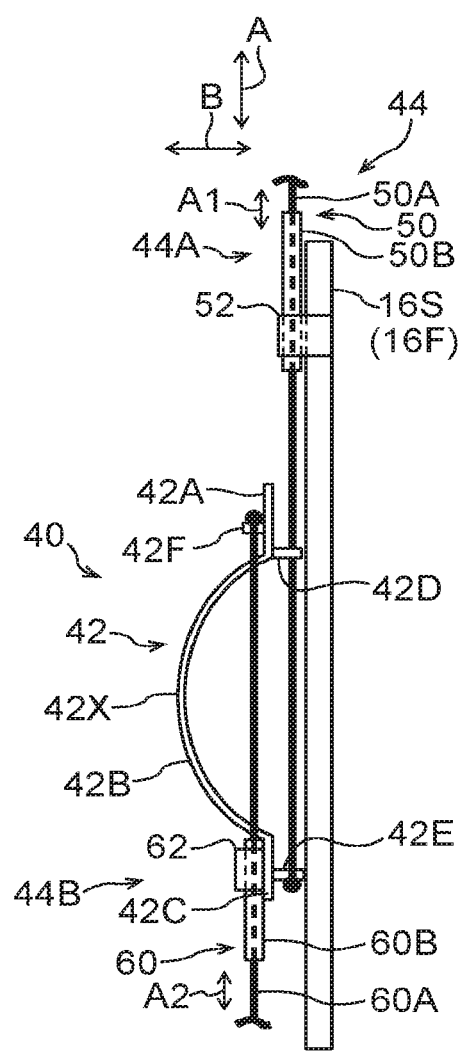
FIG. 2D is a schematic view illustrating a movable structure of a lumbar support section illustrated in FIG. 1 in side view, illustrating a state in which a protrusion apex portion of the lumbar support section is disposed at a lower side and a front side.
Figure 3B:
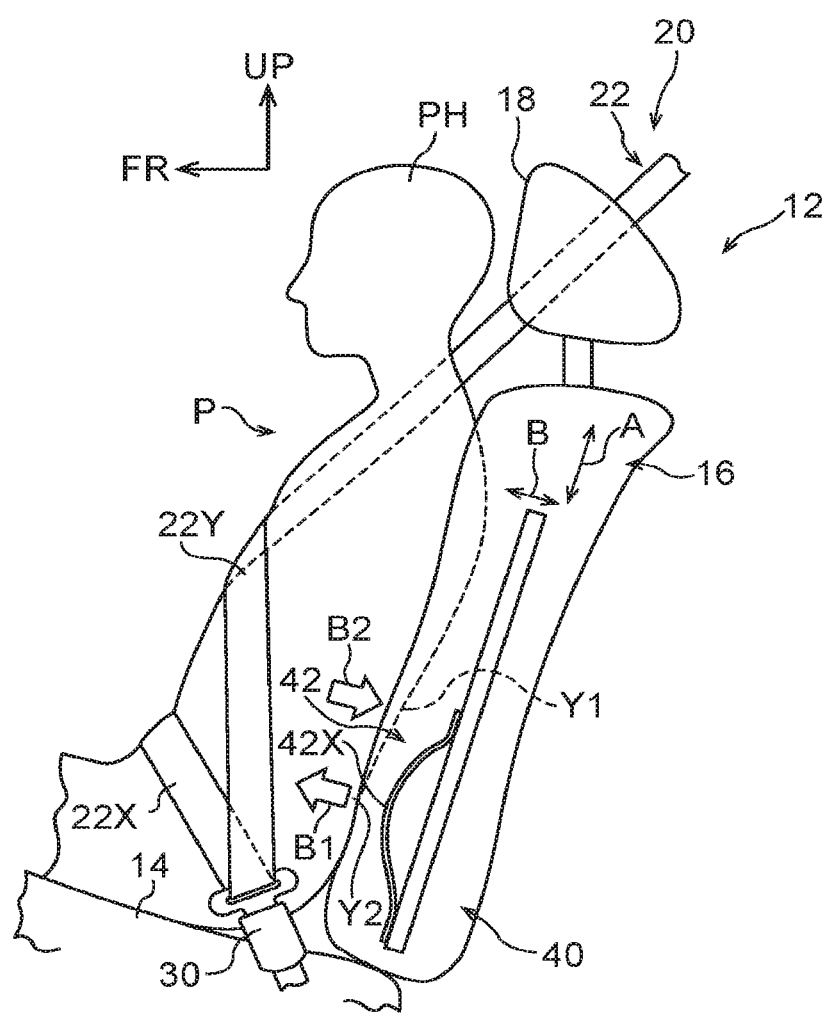
FIG. 3B is a schematic side view to explain operation of the first exemplary embodiment, and illustrates a state following actuation of a displacement mechanism after a vehicle rear-end collision has been predicted.

However, as illustrated in FIG. 3A, in cases in which a vehicle rear-end collision has been predicted by the rear collision prediction section 36B (see FIG. 1) in a state in which the protrusion apex portion 42X of the lumbar support section 42 is not at the lower limit position, and when the protrusion apex portion 42X is disposed at the advanced position, as illustrated in FIG. 2B, the lumbar support section 42 is moved to the seatback lower side movement limit by the raising-and-lowering mechanism 44A (see FIG. 2D). Accordingly, after a rear-end collision has been predicted, the supported state by the protrusion apex portion 42X of the site Y1 of the lumbar region of the seated occupant that was initially supported by the protrusion apex portion 42X as illustrated in FIG. 3B is released at an early timing, while pressing the site Y2 at the lower side of the lumbar region toward the seatback front side. Note that at the point in time when the vehicle rear-end collision is predicted, the protrusion apex portion 42X is disposed at the advanced position, thereby enabling the site Y1 of the lumbar region where the supported state by the protrusion apex portion 42X is released to obtain a stroke that permits displacement toward the seatback rear side at an early timing. After a rear-end collision has been predicted, the upper body of the seated occupant P can accordingly be encouraged to tilt toward the seatback rear side at an even earlier timing.

In the present exemplary embodiment, the three-point seatbelt device 20 illustrated in FIG. 1 restrains the upper body of the occupant P seated on the seat cushion 14 with the shoulder webbing 22Y, and restrains the lumbar region of the occupant P with the lap webbing 22X. When a vehicle rear-end collision has been predicted by the rear collision prediction section 36B, the pre-tensioner 34 is actuated to apply tension to the shoulder webbing 22Y. The upper body of the seated occupant P accordingly receives a load F toward the seatback rear side, as illustrated in FIG. 3A.

In cases in which a vehicle rear-end collision has been predicted by the rear collision prediction section 36B (see FIG. 1) in a state in which the protrusion apex portion 42X of the lumbar support section 42 is not at the lower limit position, for example in the state illustrated in FIG. 3A, the pre-tensioner 34 (see FIG. 1) is actuated, and then the displacement mechanism 44 (see FIG. 2A) is actuated, thereby setting the protrusion apex portion 42X at the lower limit position and at the advanced position as illustrated in FIG. 3B. The support position of the lumbar support section 42 is accordingly lowered after the upper body of the seated occupant P has received the load F toward the seatback rear side, and the site at the lower side of the lumbar region of the seated occupant P is pressed toward the seatback front side, thereby further encouraging the upper body of the seated occupant P to tilt toward the seatback rear side.

As described above, in the occupant protection device 10 of the present exemplary embodiment, in the event of a rear collision, the head PH of the seated occupant P can be supported by the headrest 18 at an earlier timing, thereby reducing the load applied to the neck of the seated occupant P, even in cases in which the lumbar region support position of the lumbar support section 42 is not set at the lower limit position.

Note that in the present exemplary embodiment, in cases in which a vehicle rear-end collision has been predicted by the rear collision prediction section 36B in a state in which the protrusion apex portion 42X of the lumbar support section 42 is at the lower limit position and is not at the advanced position, the pre-tensioner 34 (see FIG. 1) is actuated, and then the protrusion apex portion 42X is moved to the advanced position on the seatback front side by the displacement mechanism 44.

Modified Example of the First Exemplary Embodiment

Explanation follows regarding a modified example of the first exemplary embodiment described above. In this modified example, in cases in which a vehicle rear-end collision has been predicted by the rear collision prediction section 36B illustrated in FIG. 1, the movable range of the lumbar support section 42 in the seatback up-down direction is extended further toward the seatback lower side than the normal movable range of the lumbar support section 42 in the seatback up-down direction. This modified example enables the lumbar support section 42 to be moved toward the seatback lower side whenever the rear collision prediction section 36B predicts a vehicle rear-end collision, thereby enabling the lumbar region support position of the lumbar support section 42 to be lowered.

Second Exemplary Embodiment

Figure 4A:
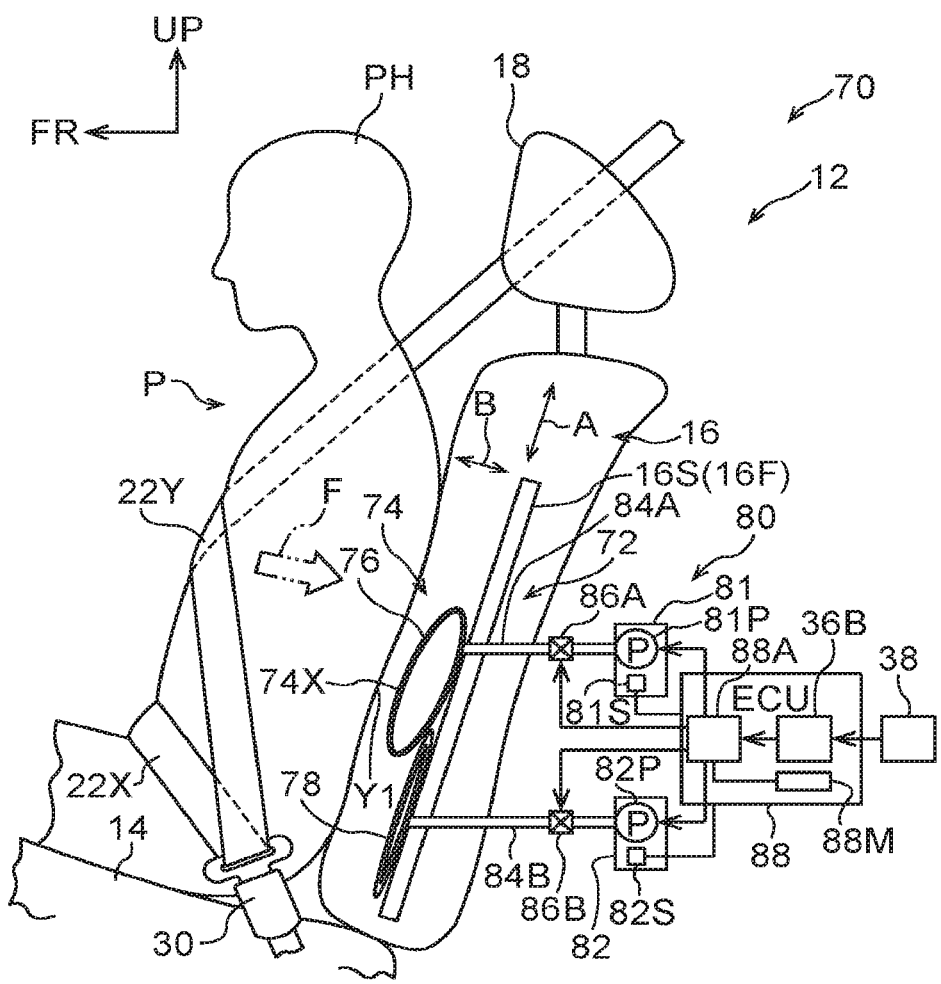
FIG. 4A is a side view schematically illustrating a vehicle seat applied with an occupant protection device according to a second exemplary embodiment, and illustrates a state immediately prior to actuation of a displacement mechanism on prediction of a vehicle rear-end collision.
Figure 4B:
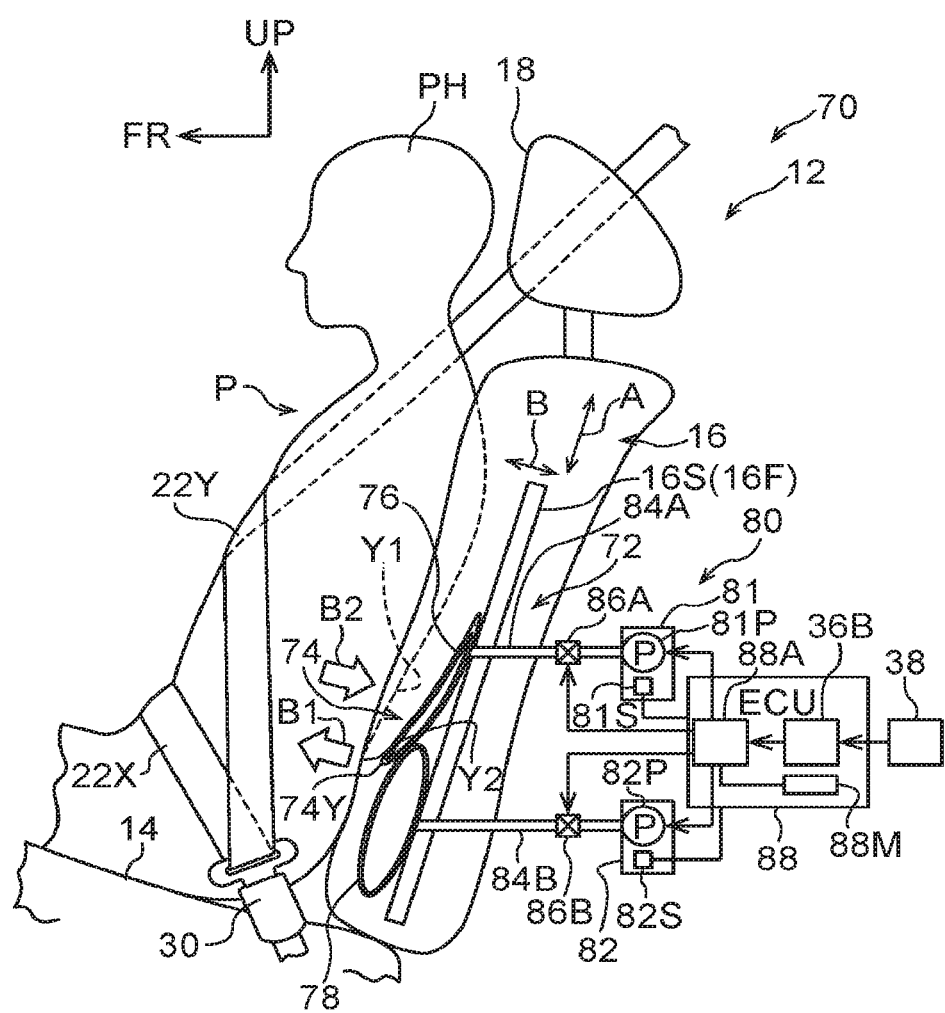
FIG. 4B is a side view schematically illustrating a vehicle seat applied with an occupant protection device according to the second exemplary embodiment, and illustrates a state following actuation of a displacement mechanism after a vehicle rear-end collision has been predicted.

Next, explanation follows regarding an occupant protection device 70 according to a second exemplary embodiment of the present invention, with reference to FIG. 4A and FIG. 4B. FIG. 4A and FIG. 4B are schematic side views illustrating the occupant protection device 70 according to the present exemplary embodiment, together with part of the vehicle seat 12. FIG. 4A illustrates a state immediately prior to actuation of a displacement mechanism 80 (described in detail later) on prediction of a vehicle rear-end collision, and FIG. 4B illustrates a state following actuation of the displacement mechanism 80 after a vehicle rear-end collision has been predicted. As illustrated in FIG. 4A and FIG. 4B, the occupant protection device 70 differs from the occupant protection device 10 (see FIG. 1) according to the first exemplary embodiment in the point that it includes a lumbar support device 72 in place of the lumbar support device 40 (see FIG. 1). Other configurations are effectively the same as in the first exemplary embodiment. Accordingly, configuration sections that are effectively the same as in the first exemplary embodiment are allocated the same reference numerals, and explanation thereof is omitted.

As illustrated in FIG. 4A, the lumbar support device 72 includes a lumbar support section 74 that supports the lumbar region of the occupant P seated on the seat cushion 14 of the vehicle seat 12, and also includes the displacement mechanism 80 for displacing the lumbar support section 74. An ECU 88 is installed to the vehicle. The ECU 88 includes an actuation controller 88A, a rear collision prediction section 36B similar to that of the first exemplary embodiment, and a memory section 88M configured by RAM or the like. The actuation controller 88A has effectively the same configuration as the actuation controller 36A (see FIG. 1) of the first exemplary embodiment, except for in the points below.

The lumbar support section 74 is inbuilt to the seatback 16 over a range that supports the lumbar region of the seated occupant P (a width direction intermediate portion and a lower portion side of the seatback 16), and includes an upper side air bladder 76 and a lower side air bladder 78. The upper side air bladder 76 is disposed at a height position approximately corresponding to an upper portion side of the lumbar region of the seated occupant P. The lower side air bladder 78 is disposed at a height position approximately corresponding to a lower portion side of the lumbar region of the seated occupant P. The upper side air bladder 76 and the lower side air bladder 78 are attached to the seatback frame 16F, and a lower end portion of the upper side air bladder 76 overlaps with an upper end portion of the lower side air bladder 78 at the seatback front side.

As illustrated in FIG. 4A and FIG. 4B, the upper side air bladder 76 and the lower side air bladder 78 respectively adopt an inflated state when air (gas) flows inside, and adopt a deflated state by releasing the air (gas) from the inside. By changing the states of the upper side air bladder 76 and the lower side air bladder 78, the frontmost location where the lumbar support section 74 is disposed furthest to the seatback front side (indicated by 74X in FIG. 4A, and by 74Y in FIG. 4B) is displaceable at least between an upper limit position and a lower limit position. Moreover, the lumbar support section 74 is displaceable between an advanced position pressing the lumbar region of the seated occupant P, and a retreated position further to the seatback rear side than the advanced position. Note that the support position of the upper portion side of the lumbar region of the seated occupant P is set as the upper limit position in the seatback up-down direction, and the support position of the lower side of the lumbar region of the seated occupant P is set as the lower limit position in the seatback up-down direction.

The displacement mechanism 80 includes pumps 81, 82. The pump 81 includes a pump body 81P and a sensor section 81S. Similarly, the pump 82 includes a pump body 82P and a sensor section 82S. The pump bodies 81P, 82P are configured so as to be driven based on command signals output from the actuation controller 88A. The sensor sections 81S, 82S include, for example, Hall effect ICs. The sensor section 81S is configured so as to output signals to the memory section 88M according to pressure increases or pressure decreases due to actuation of the pump body 81P, and the sensor section 82S is configured so as to output signals to the memory section 88M according to pressure increases or pressure decreases due to actuation of the pump body 82P.

One end portion of a first tube 84A is connected to the pump body 81P, and the upper side air bladder 76 is connected to another end portion of the first tube 84A. Moreover, one end portion of a second tube 84B is connected to the pump body 82P, and the lower side air bladder 78 is connected to another end portion of the second tube 84B. A valve 86A is provided to the first tube 84A at a flow path intermediate portion, and a valve 86B is similarly provided to the second tube 84B at a flow path intermediate portion.

The upper side air bladder 76 is switched between the inflated state and the deflated state by actuating the pump body 81P and the valve 86A. The lower side air bladder 78 is switched between the inflated state and the deflated state by actuating the pump body 82P and the valve 86B. The displacement mechanism 80 displaces the frontmost location of the lumbar support section 74 by actuating the pump bodies 81P, 82P and the valves 86A, 86B in this manner.

At a side face of the seat cushion 14, the lumbar support device 72 also includes a manual switch (not illustrated in the drawings) employed by the occupant to adjust the position of the lumbar support section 74, similarly to in the first exemplary embodiment. The manual switch is configured to output signals to the ECU 88 according to the operation of the occupant.

The ECU 88 is electrically connected to the pumps 81, 82 and the valves 86A, 86B. In cases in which a vehicle rear-end collision has been predicted by the rear collision prediction section 36B in a state in which the frontmost location of the lumbar support section 74 is not at the lower limit position (for example, a state at the position labelled 74X in FIG. 4A), the actuation controller 88A of the ECU 88 actuates the pre-tensioner 34 (see FIG. 1), and then controls the pump bodies 81P, 82P and the valves 86A, 86B of the displacement mechanism 80, and the frontmost location is set to the lower limit position and the advanced position (the position labelled 74Y), as illustrated in FIG. 4B.

The memory section 88M stores the signals output from the sensor sections 81S, 82S as position information of the frontmost location of the lumbar support section 74. The actuation controller 88A determines whether or not a state is present in which the frontmost location of the lumbar support section 74 is not at the lower limit position based on the position information stored in the memory section 88M. Moreover, in the present exemplary embodiment, in cases in which a vehicle rear-end collision has been predicted by the rear collision prediction section 36B in a state in which the frontmost location of the lumbar support section 74 is at the lower limit position but is not at the advanced position, the actuation controller 88A actuates the pre-tensioner 34 (see FIG. 1), and then controls the displacement mechanism 80 such that the frontmost location of the lumbar support section 74 is displaced to the advanced position (the position labelled 74Y) on the seatback front side, as illustrated in FIG. 4B.

Due to the configuration of the present exemplary embodiment, in cases in which a vehicle rear-end collision has been predicted by the rear collision prediction section 36B in a state in which the frontmost location of the lumbar support section 74 is not at the lower limit position, for example in the state illustrated in FIG. 4A, the pre-tensioner 34 (see FIG. 1) is actuated, and then the valves 86A, 86B are opened, and the pump body 81P is actuated such that air (gas) is released from inside the upper side air bladder 76, and the pump body 82P is actuated such that air (gas) flows into the lower side air bladder 78. The frontmost location is thus set at the lower limit position and the advanced position (the position labelled 74Y), as illustrated in FIG. 4B.

The configuration of the present exemplary embodiment also enables the head PH of the seated occupant P to be supported by the headrest 18 at an earlier timing in the event of a rear collision, thereby reducing the load applied to the neck of the seated occupant P, even in cases in which the lumbar region support position of the lumbar support section 74 is not set at the lower limit position.

Third Exemplary Embodiment

Figure 5A:
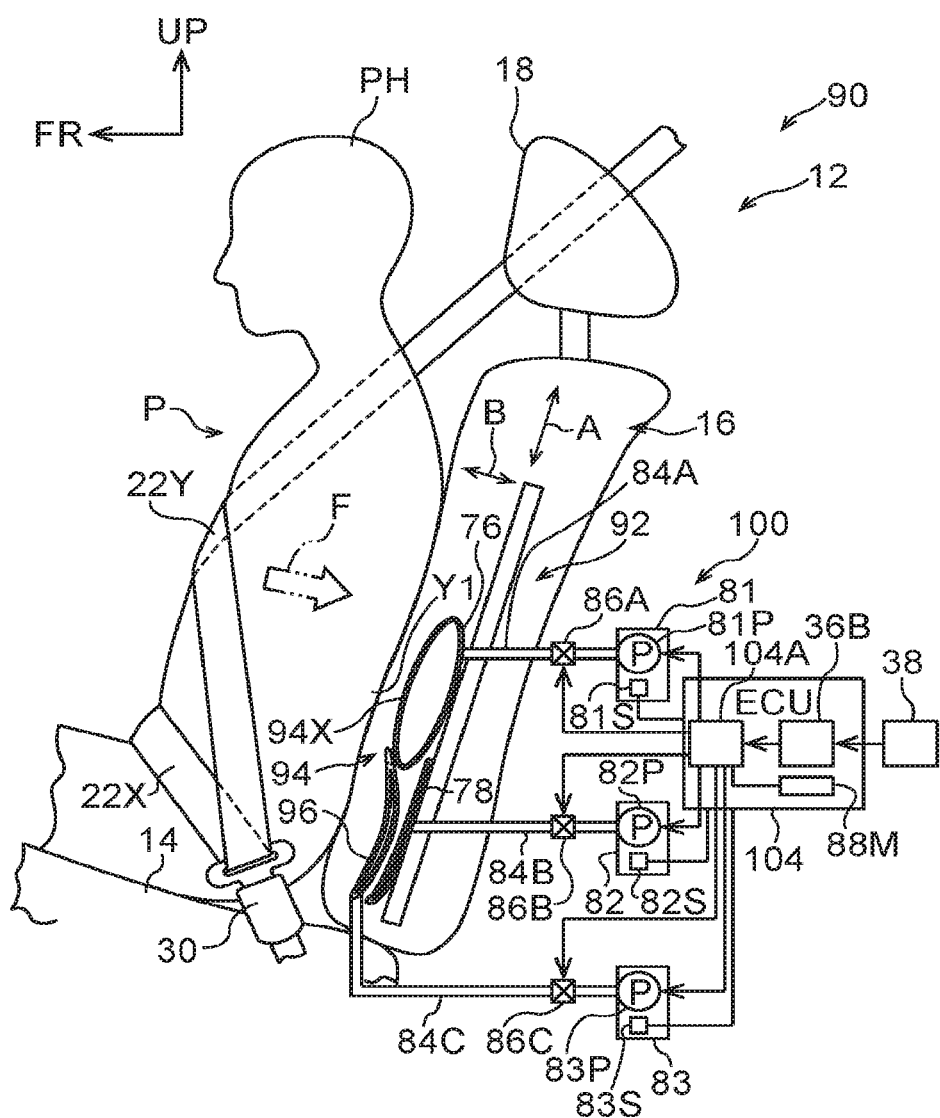
FIG. 5A is a side view schematically illustrating a vehicle seat applied with an occupant protection device according to a third exemplary embodiment, and illustrates a state immediately prior to actuation of a displacement mechanism on prediction of a vehicle rear-end collision.
Figure 5B:
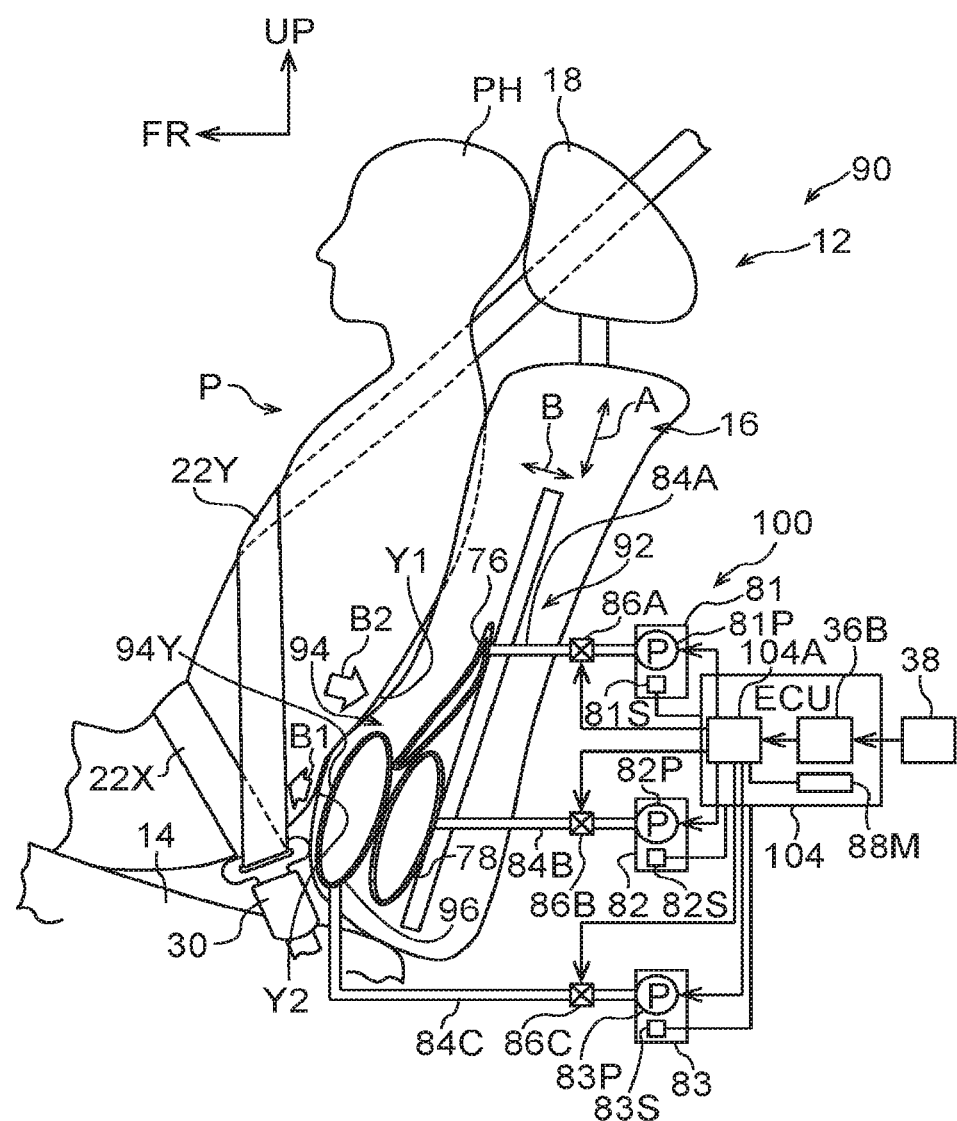
FIG. 5B is a side view schematically illustrating a vehicle seat applied with an occupant protection device according to the third exemplary embodiment, and illustrates a state following actuation of a displacement mechanism after a vehicle rear-end collision has been predicted.

Next, explanation follows regarding an occupant protection device 90 according to a third exemplary embodiment of the present invention, with reference to FIG. 5A and FIG. 5B. FIG. 5A and FIG. 5B are schematic side views illustrating the occupant protection device 90 according to the present exemplary embodiment, together with part of the vehicle seat 12. FIG. 5A illustrates a state immediately prior to actuation of a displacement mechanism 100 (described in detail later) on prediction of a vehicle rear-end collision, and FIG. 5B illustrates a state following actuation of the displacement mechanism 100 after a vehicle rear-end collision has been predicted. As illustrated in FIG. 5A and FIG. 5B, the occupant protection device 90 differs from the second exemplary embodiment in the point that a dedicated rear collision air bladder 96 is also provided. Other configurations are effectively the same as in the second exemplary embodiment. Accordingly, configuration sections that are effectively the same as in the second exemplary embodiment are allocated the same reference numerals, and explanation thereof is omitted.

As illustrated in FIG. 5A, a lumbar support device 92 includes a lumbar support section 94 that supports the lumbar region of the seated occupant P seated on the seat cushion 14 of the vehicle seat 12, and also includes the displacement mechanism 100 for displacing the lumbar support section 94. An ECU 104 is installed to the vehicle. The ECU 104 includes an actuation controller 104A, a rear collision prediction section 36B similar to that of the first and second exemplary embodiments, and a memory section 88M that is effectively the same as in the second exemplary embodiment. The actuation controller 104A has effectively the same configuration as the actuation controller 88A of the second exemplary embodiment, except for in the points below. Signals are also output to the ECU 104 according to operation of a manual switch (not illustrated in the drawings) by the occupant, similarly to in the second exemplary embodiment.

The lumbar support section 94 includes the air bladder 96 inside the seatback 16, at the seatback front side of the lower side air bladder 78. By changing the states of the upper side air bladder 76, the lower side air bladder 78, and the dedicated rear collision air bladder 96, the frontmost location disposed furthest to the seatback front side (labelled 94X in FIG. 5A, and 94Y in FIG. 5B) of the lumbar support section 94 can at least be displaced between an upper limit position and a lower limit position, in which the upper limit position is a position supporting an upper portion side of the lumbar region of the seated occupant P in the seatback up-down direction, and the lower limit position is a position supporting a lower portion side of the lumbar region of the seated occupant P in the seatback up-down direction, and can also be displaced between an advanced position pressing the lumbar region of the seated occupant P, and a retreated position further to the seatback rear side than the advanced position.

The displacement mechanism 100 further includes a pump 83, as illustrated on the lower side in the drawings. The pump 83 includes a pump body 83P and a sensor section 83S. The pump body 83P is configured so as to be driven based on command signals output from the actuation controller 104A. The sensor section 83S includes, for example, a Hall effect IC, and is configured so as to output signals to the memory section 88M according to pressure increases or pressure decreases due to actuation of the pump body 83P.

One end portion of a third tube 84C is connected to the pump body 83P, and the air bladder 96 is connected to another end portion of the third tube 84C. A valve 86C is provided to the third tube 84C at a flow path intermediate portion. The air bladder 96 is switched between the inflated state and the deflated state by actuating the pump body 83P and the valve 86C. The displacement mechanism 100 displaces the frontmost location of the lumbar support section 94 by actuating the pump bodies 81P, 82P, 83P and the valves 86A, 86B, 86C.

The ECU 104 is electrically connected to the pump 83 and the valve 86C. Note that setting is made such that the pump body 83P and the valve 86C are not actuated except for in cases in which a vehicle rear-end collision has been predicted by the rear collision prediction section 36B of the ECU 104.

In cases in which a vehicle rear-end collision has been predicted by the rear collision prediction section 36B in a state in which the frontmost location of the lumbar support section 94 is not at the lower limit position (for example, a state at the position labelled 94X in FIG. 5A), the actuation controller 104A actuates the pre-tensioner 34 (see FIG. 1), and then controls the pump bodies 81P, 82P, 83P and the valves 86A, 86B, 86C of the displacement mechanism 100, and the frontmost location is set to the lower limit position and the advanced position, as illustrated in FIG. 5B.

Note that the memory section 88M stores the signals output from the sensor sections 81S, 82S, 83S as position information of the frontmost location of the lumbar support section 94. The actuation controller 104A determines whether or not a state is present in which the frontmost location of the lumbar support section 94 is not at the lower limit position based on the position information stored in the memory section 88M. Moreover, in the present exemplary embodiment, in cases in which a vehicle rear-end collision has been predicted by the rear collision prediction section 36B in a state in which the frontmost location of the lumbar support section 94 is at the lower limit position but is not at the advanced position, the actuation controller 104A actuates the pre-tensioner 34 (see FIG. 1), and then controls the displacement mechanism 100 such that the frontmost location of the lumbar support section 94 is displaced to the advanced position on the seatback front side.

Due to the configuration of the present exemplary embodiment, in cases in which a vehicle rear-end collision has been predicted by the rear collision prediction section 36B in a state in which the frontmost location of the lumbar support section 94 is not at the lower limit position, for example in the state illustrated in FIG. 5A, the pre-tensioner 34 (see FIG. 1) is actuated, and then the valves 86A, 86B, 86C are opened, and the pump body 81P is actuated such that air (gas) is released from inside the upper side air bladder 76, and the pump bodies 82P, 83P are actuated such that air (gas) flows into the lower side air bladder 78 and the dedicated rear collision air bladder 96. The frontmost location 94Y is thereby set at the lower limit position and the advanced position, as illustrated in FIG. 5B.

The configuration of the present exemplary embodiment also enables the head PH of the seated occupant P to be supported by the headrest 18 at an earlier timing in the event of a rear collision, thereby reducing the load applied to the neck of the seated occupant P, even in cases in which the lumbar region support position of the lumbar support section 94 is not set at the lower limit position. Moreover, in the present exemplary embodiment, the dedicated rear collision air bladder 96 inflates in addition to the lower side air bladder 78 when a rear-end collision has been predicted, thereby enabling the displacement amount of the lower portion side of the lumbar region of the seated occupant P toward the seatback front side to be increased. The seated occupant P is thereby encouraged to tilt even more in the event of a rear collision.

Supplementary Explanation of the Exemplary Embodiments

In the first exemplary embodiment described above, the advancing-and-retreating mechanism 44B that is shown in FIG. 2 is attached to the lumbar support section 42. However, there is no limitation thereto, and the advancing-and-retreating mechanism 44B may be attached to a fixed portion such as the seatback frame 16F. In such a configuration, in order to coordinate the inner cable 60A of the push-pull wire 60 with displacement of the lumbar support section 42 in the advancing-and-retreating mechanism 44B, the inner cable 60A is moved in the seatback up-down direction when the lumbar support section 42 is displaced in the seatback up-down direction, without displacing the protrusion apex portion 42X of the lumbar support section 42 in the seatback front-rear direction.

In this variation, in cases in which the lumbar support section 42 is displaced in the seatback up-down direction while displacing the protrusion apex portion 42X of the lumbar support section 42 in the seatback front-rear direction, a difference is provided between the displacement of the lumbar support section 42 and the movement amount of the inner cable 60A. As an example, the movement amount of the inner cable 60A may be larger than the displacement of the lumbar support section 42 when the protrusion apex portion 42X of the lumbar support section 42 is displaced toward the seatback front side while displacing the lumbar support section 42 toward the bottom of the seatback. The distance between the upper end portion 42A and the lower end portion 42C of the lumbar support section 42 decreases, thereby increasing the curvature of the curved portion 42B, and moving the protrusion apex portion 42X toward the seatback front side.

In the exemplary embodiments described above, the lumbar support device 40, 72, 92 is controlled so as to actuate after actuating the pre-tensioner 34 when a vehicle rear-end collision has been predicted by the rear collision prediction section 36B that is shown in FIG. 1. However, as a modified example, the actuation controller (36A, 88A, 104A) may control the pre-tensioner (34) so as to actuate the pre-tensioner (34) at the same time as, or later than, actuating the lumbar support device (40, 72, 92) when a vehicle rear-end collision has been predicted by the rear collision prediction section (36B). As another modified example, configuration may be made in which the pre-tensioner (34) is not set so as to actuate when a vehicle rear-end collision has been predicted by the rear collision prediction section (36B).

As a modified example of the first exemplary embodiment, in cases in which a vehicle rear-end collision has been predicted by the rear collision prediction section 36B in a state in which the protrusion apex portion 42X of the lumbar support section 42 is not at the lower limit position, and when the protrusion apex portion 42X is not disposed at the advanced position, the actuation controller 36A illustrated in FIG. 1 may control the motor body 46M of the raising-and-lowering mechanism 44A and the motor body 56M of the advancing-and-retreating mechanism 44B illustrated in FIG. 2A so as to move the protrusion apex portion 42X toward the advanced position at the seatback front side while moving the lumbar support section 42 toward the seatback lower side movement limit. Moreover, as another modified example of the first exemplary embodiment, in cases in which a vehicle rear-end collision has been predicted by the rear collision prediction section 36B in a state in which the protrusion apex portion 42X of the lumbar support section 42 is not at the lower limit position and the protrusion apex portion 42X is not disposed at the advanced position, the actuation controller 36A illustrated in FIG. 1 may control the motor body 56M of the advancing-and-retreating mechanism 44B illustrated in FIG. 2A so as to move the protrusion apex portion 42X to the advanced position at the seatback front side, and then control the motor body 46M of the raising-and-lowering mechanism 44A so as to move the lumbar support section 42 to the seatback lower side movement limit.

In the exemplary embodiments described above, the upright buckle device 30 illustrated in FIG. 1 is provided at a vehicle width direction inside side portion of the seat cushion 14. However, the upright buckle device 30 may be provided on the vehicle body floor. In addition to the configuration of the above exemplary embodiments, a moving mechanism may be provided to (reversibly) move the buckle device 30 in the up-down direction, and when a vehicle rear-end collision has been predicted by the rear collision prediction section 36B, the moving mechanism may be actuated at the same time as, or later than, actuation of the lumbar support section 42, 74, 94, so as to lower the position of the buckle device 30 toward the lower side.

Similarly, in addition to the configuration of the above exemplary embodiments, another moving mechanism may be interposed between a vehicle width direction outside side portion of the seat cushion 14 and the anchor plate 24 so as to (reversibly) move the anchor plate 24 in the up-down direction. When a vehicle rear-end collision has been predicted by the rear collision prediction section 36B, the other moving mechanism may be actuated at the same time as, or later than, actuation of the lumbar support section 42, 74, 94, so as to lower the position of the anchor plate 24 toward the lower side.

Note that in the first aspect of the present invention, "a frontmost location disposed furthest to the seatback front side" includes cases in which, as in the first exemplary embodiment, the portion of the lumbar support section 42 corresponding to the frontmost location is always the same portion, and cases in which, as in the second and third exemplary embodiments, the portion of the lumbar support section 74, 94 corresponding to the frontmost location changes.

Note that in the first aspect of the present invention, "the frontmost location is displaceable between an advanced position and a retreated position" refers to being able to change the position of the frontmost location, with the "advanced position" referring to a seatback front-rear direction front side limit position, and the "retreated position" referring to a seatback front-rear direction rear side limit position, as in the exemplary embodiments described above.

Combinations of the exemplary embodiments and the plural modified examples described above may be implemented as appropriate.

Explanation has been given regarding examples of the present invention; however, the present invention is not limited to the above, and obviously various other modifications may be implemented within a range not departing from the spirit of the present invention.

What is claimed is:

1. An occupant protection device including a lumbar support comprising:
    a lumbar support section that is provided at a seatback of a vehicle seat, that is configured to support a lumbar region of an occupant seated on a seat cushion of the vehicle seat, and that has a frontmost location disposed furthest to a seatback front side, the frontmost location is displaceable at least between an upper limit position in a seatback up-down direction and a lower limit position in the seatback up-down direction, the upper limit position being a position supporting an upper portion side of the lumbar region and the lower limit position being a position supporting a lower portion side of the lumbar region, and the frontmost location is also displaceable between an advanced position pressing against the lumbar region and a retreated position further to a seatback rear side than the advanced position;
    a displacement mechanism that displaces the frontmost location of the lumbar support section;
    a rear collision prediction section that predicts a rear-end collision to a vehicle; and
    an actuation controller that, in cases in which a vehicle rear-end collision has been predicted by the rear collision prediction section in a state in which the frontmost location of the lumbar support section is not at the lower limit position, controls the displacement mechanism, and sets the frontmost location at the lower limit position and at the advanced position.

2. The occupant protection device including a lumbar support of claim 1, wherein:
    the lumbar support section is capable of moving in the seatback up-down direction; and
    in cases in which a vehicle rear-end collision has been predicted by the rear collision prediction section, a movable range of the lumbar support section in the seatback up-down direction is extended further to a seatback lower side than a normal movable range of the lumbar support section in the seatback up-down direction.

3. The occupant protection device including a lumbar support of claim 1, further comprising:
    a three-point seatbelt device that is configured to restrain an upper body of the occupant seated on the seat cushion with shoulder webbing, and that is configured to restrain the lumbar region of the occupant with lap webbing; and
    a pre-tensioner that actuates, and applies tension to the shoulder webbing in cases in which a vehicle rear-end collision has been predicted by the rear collision prediction section,
    wherein, in cases in which a vehicle rear-end collision has been predicted by the rear collision prediction section in a state in which the frontmost location of the lumbar support section is not at the lower limit position, the actuation controller actuates the pre-tensioner and then controls the displacement mechanism, and sets the frontmost location at the lower limit position and at the advanced position.

4. The occupant protection device including a lumbar support of claim 1, wherein:
    the displacement mechanism includes a raising-and-lowering mechanism that moves the lumbar support section in the seatback up-down direction, and an advancing-and-retreating mechanism that moves the frontmost location in a seatback front-rear direction; and
    in cases in which a vehicle rear-end collision has been predicted by the rear collision prediction section in a state in which the frontmost location of the lumbar support section is not at the lower limit position,
        when the frontmost location is not disposed at the advanced position, the actuation controller controls the raising-and-lowering mechanism, moves the lumbar support section to a seatback lower side movement limit, then controls the advancing-and-retreating mechanism, and moves the frontmost location to the advanced position on the seatback front side, and
        when the frontmost location is disposed at the advanced position, the actuation controller controls the raising-and-lowering mechanism, and moves the lumbar support section to the seatback lower side movement limit.

5. The occupant protection device including a lumbar support of claim 1, wherein:
    the displacement mechanism includes a raising-and-lowering mechanism that moves the lumbar support section in the seatback up-down direction, and an advancing-and-retreating mechanism that moves the frontmost location in a seatback front-rear direction; and
    in cases in which a vehicle rear-end collision has been predicted by the rear collision prediction section in a state in which the frontmost location of the lumbar support section is not at the lower limit position, when the frontmost location is not disposed at the advanced position, the actuation controller controls the raising-and-lowering mechanism and the advancing-and-retreating mechanism, and moves the frontmost location toward the advanced position at the seatback front side while moving the lumbar support section toward a seatback lower side movement limit.

6. The occupant protection device including a lumbar support of claim 1, wherein:

the displacement mechanism includes a raising-and-lowering mechanism that moves the lumbar support section in the seatback up-down direction, and an advancing-and-retreating mechanism that moves the frontmost location in a seatback front-rear direction; and in cases in which a vehicle rear-end collision has been predicted by the rear collision prediction section in a state in which the frontmost location of the lumbar support section is not at the lower limit position, when the frontmost location is not disposed at the advanced position, the actuation controller controls the advancing-and-retreating mechanism, moves the frontmost location to the advanced position, then controls the raising-and-lowering mechanism, and moves the lumbar support section to a seatback lower side movement limit.

7. The occupant protection device including a lumbar support of claim 1, wherein:

the lumbar support section includes an upper side air bladder, a lower side air bladder, and a dedicated rear collision air bladder provided at the seatback front side of the lower side air bladder;

the displacement mechanism is configured by increasing pressure and decreasing pressure of the upper side air bladder, the lower side air bladder, and the dedicated rear collision air bladder; and in cases in which a vehicle rear-end collision has been predicted by the rear collision prediction section in a state in which the upper side air bladder is in an inflated state, and the lower side air bladder and the dedicated rear collision air bladder are each in a deflated state, and in which the frontmost location of the lumbar support section is neither at the lower limit position nor at the advanced position, the actuation controller controls the displacement mechanism such that the upper side air bladder adopts a deflated state, and the lower side air bladder and the dedicated rear collision air bladder adopt an inflated state.

* * * * *